United States Patent [19]
Kupper

[11] 4,316,516
[45] Feb. 23, 1982

[54] WEIGHING BALANCE WITH AUTOMATIC ZERO CORRECTION

[75] Inventor: Walter Kupper, Madison, N.J.

[73] Assignee: Mettler Instrumente AG, Greifensee, Switzerland

[21] Appl. No.: 195,331

[22] Filed: Oct. 9, 1980

[30] Foreign Application Priority Data

Dec. 20, 1979 [CH] Switzerland .................. 11309/79

[51] Int. Cl.³ .................. G01G 19/04; G01G 19/52; G01G 23/10
[52] U.S. Cl. .................................. 177/25; 177/50; 177/185; 177/DIG. 3
[58] Field of Search ............ 177/25, 50, 185, 210 FP, 177/DIG. 3; 364/567, 734

[56] References Cited

U.S. PATENT DOCUMENTS

| | | | |
|---|---|---|---|
| 3,665,169 | 5/1972 | Henderson et al. ............ | 177/25 X |
| 3,786,884 | 1/1974 | Allenspach ............... | 177/210 FP X |
| 3,797,595 | 3/1974 | Yin et al. ..................... | 177/DIG. 3 |
| 3,860,802 | 1/1975 | Knothe et al. ................. | 177/DIG. 3 |
| 3,986,012 | 10/1976 | Loshbough et al. ............. | 177/25 X |
| 4,044,846 | 8/1977 | Matilainen .................... | 177/DIG. 3 |
| 4,137,979 | 2/1979 | Itani ............................ | 177/DIG. 3 |

Primary Examiner—George H. Miller, Jr.
Attorney, Agent, or Firm—Marianne Rich

[57] ABSTRACT

When the difference between the weight proportional signal and the tare value is less than a predetermined threshold value, it is assumed that the zero point is changing. Main difference signals less than the threshold signal are stored and subsequently generated ones algebraically added to the first one. The so-created cumulative difference signal is compared to a predetermined limiting value. When it exceeds the limiting value the cumulative difference signal is divided by the number of differences which together created the cumulative difference signal. The so-formed average difference signal is added to the tare value prior to generation of the next main difference signal.

3 Claims, 2 Drawing Figures

WEIGHING BALANCE WITH AUTOMATIC ZERO CORRECTION

Cross Reference to Related Applications and Publications

U.S. Pat. No. 3,986,012;
U.S. Pat. No. 3,665,169;
U.S. Pat. No. 3,786,884;
U.S. application Ser. No. 195,332 for: "Improved Automatic Zero Correction Apparatus for Weighing Balances"; Inventor: E. Jonath; and
U.S. application Ser. No. 195,477 for: "Weighing Scale with Improved Zero Correction"; Inventor: E. Jonath
both filed simultaneously herewith and assigned to the same assignee.

The present invention relates to weighing methods and apparatus and, in particular, to scales having automatic zero correction.

BACKGROUND AND PRIOR ART

Automatic zero point correction methods and apparatus are known. In such methods and apparatus, a signal corresponding to a reference weight is stored in a first storage. Subsequent weight-proportional signals are compared to the stored signal, the difference between the new and the stored signal being compared to a predetermined threshold value. The digital display is changed to correspond to the new value only when the difference is at least as big as the threshold value. Differences smaller than the threshold value are utilized for zero correction purposes.

Such a method is described in U.S. Pat. No. 3,665,169. In this method, differences smaller than the threshold value (first differences) cause the new weighing signal to be stored in the first storage, instead of the reference value. Thus, in the case of differences less than the threshold value, the full difference is immediately effective in changing the zero point. This method and apparatus has the disadvantage that transient oscillations in the weighing signal cause a full and generally unnecessary correction.

SUMMARY OF THE INVENTION

It is an object of the present invention to furnish an automatic zero correction which does not have the above disadvantages. In other words, a reliable correction of drift is to take place, while transient oscillations are not to be taken into consideration too strongly.

In accordance with the present invention, first differences, i.e., differences that are smaller than the threshold value are stored in a second storage. The contents of the second storage are compared to a second threshold value. When the contents of the second storage exceed the second threshold value, the number in the storage is divided by the number of differences which contributed to the stored signal. The average value of the difference is thus computed. This average value is then taken into consideration in determining the main difference, i.e., the difference between the weight proportional signal and the signal stored in the first storage, (for example, the tare value).

The above mentioned difference value can be utilized by adding it to the newly generated weight proportional signal before its comparison to the stored signal. However, in a simpler, preferred embodiment of the invention, the average difference value is algebraically added to the contents of the first storage, i.e., to the reference weight. In effect thus an average value of the difference signal is compared from n individual values and the new average value is stored as a new reference value for comparison with later generated weight proportional signals.

The method and system of the present invention have the advantage, that an almost complete correction of the zero point of the balance results but the change is carried out with damping. Specifically, when accidental or transient oscillations occur, the signs of their differences will change and the resultant average value will be such that a correction of the reference value will not become necessary. If, however, a drift is present, such a drift will be compensated for after a few measuring cycles. When both drift and transient oscillations occur simultaneously, the effect is still the same. A net deviation will occur because of the drift, while the transient oscillations will generally not contribute to the zero point correction.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

FIG. 1 is a block diagram of a known balance equipped with the automatic zero correction according to the present invention; and FIG. 2 is a flow chart for a microprocessor incorporating the present invention.

DESCRIPTION OF THE PREFERRED EMBODIMENT

Figure 1:
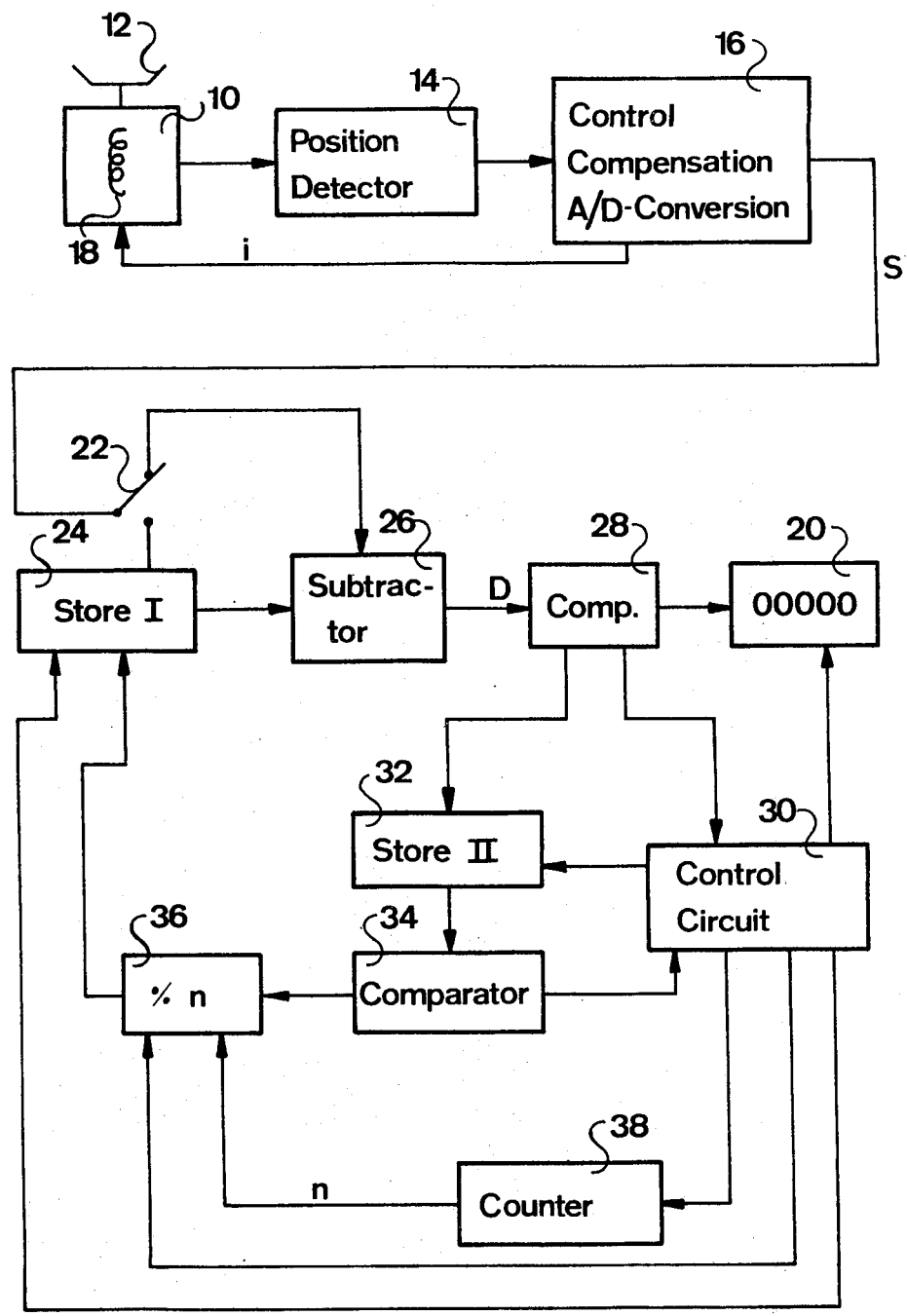

As shown in FIG. 1, a scale 10 has a load receiver, namely a pan 12. Pan 12 moves in accordance with the applied load. The position of the pan is sensed by a sensor 14 which furnishes a voltage corresponding to the so-sensed position. This voltage u is connected to a control and compensation circuit 16 which furnishes a load proportional current i. Current i is applied to a compensation coil 18 which is rigidly connected to pan 12. The compensation coil is arranged in the air gap of a permanent magnet system. The electromagnetic force exerted by coil current i causes the pan to return to an equilibrium position. A digital signal S is also generated in circuit 16. Digital signal S has a value corresponding to load proportional current i and is applied to a digital display 20.

For scales having a relatively high resolution, the signal S includes at least one place more than is visible in digital display 20.

A tare circuit is provided for taking into account the weight of the container holding the substance to be weighed and/or any dead weight the value of which is not to be displayed. The tare circuit includes a tare switch 22. Activation of tare switch 22 causes the digital signal S to be stored in a first storage (store I) having reference numeral 24. In subsequent measuring periods, the newly generated signal S is subtracted from the so-stored value in a subtraction circuit 26. The difference signal generated at the output of subtraction circuit 26 is denoted by D in FIG. 1. Whenever the newly furnished weight signal S is equal to the stored signal, (e.g. if none of the substance to be weighed has as yet been added into the container on pan 12) the signal D becomes zero. This value is then displayed on display 20. When the substance to be weighed is then applied, the difference signal D corresponds to the net weight which is displayed in display 20.

This is the operation of the known scale described in U.S. Pat. No. 3,786,884. No further details of its operation need be given here since it is described herein only to illustrate the incorporation of the present invention into an existing system.

In accordance with the present invention, this known scale is now modified as follows to correct for any possible zero point drift. A comparator 28 is provided for comparing the difference signal (herein referred to as the main difference signal) to a fixed threshold value Sw. This threshold value may, for example, correspond to one unit in the last place displayed on display 20. If the difference D is larger than the threshold value, the assumption exists that a true change in weight is taking place. A control circuit 30, in response to a second difference signal, i.e., a difference signal indicative of a value of D exceeding the threshold value, allows the difference signal D to be displayed on display 20. If the difference D is less than the threshold value, a first difference signal is generated by comparator 28. This first difference signal is not applied to control circuit 30 and the display remains unchanged. The first difference signal is stored in storage II having reference number 32. Subsequent first difference signals are algebraically added to the so-stored signal. After each storage of a new first difference signal in storage II, its accumulated content is compared in a comparator 34 to a fixed limiting value G. This limiting value may, for example, be equal to two units in the last place on the display. If the contents of storage II reach or exceed the value G, the value stored in storage II is divided in a divider 36 by a number n. n is a whole number and represents the number of differences D<Sw (including the case D=0, i.e. the signal S=the value in storage I), as counted in counter 38 since the last change in weight or since the last correction of the contents of storage I. The last change in weight (true weight change) was of course the last time that the difference D was equal to a greater than the threshold value Sw. The average difference value computed by this division by n is algebraically added to the contents of storage I, i.e., either added or subtracted depending upon the sign of the average value. Following the correction, the contents of storage II are erased and counter 38 is reset to zero. The erasing and the resetting also takes place whenever a true weight change is present, i.e., whenever D≧Sw. Of course, it can happen that the balance operates without drift or transient oscillations over a relatively long time. This can cause counter 38 to reach its full capacity before the contents of counter II have reached the limiting value G. Under these circumstances, a carry impulse generated when counter 38 overflows erases the contents of storage II, or resets the storage to zero.

Figure 2:
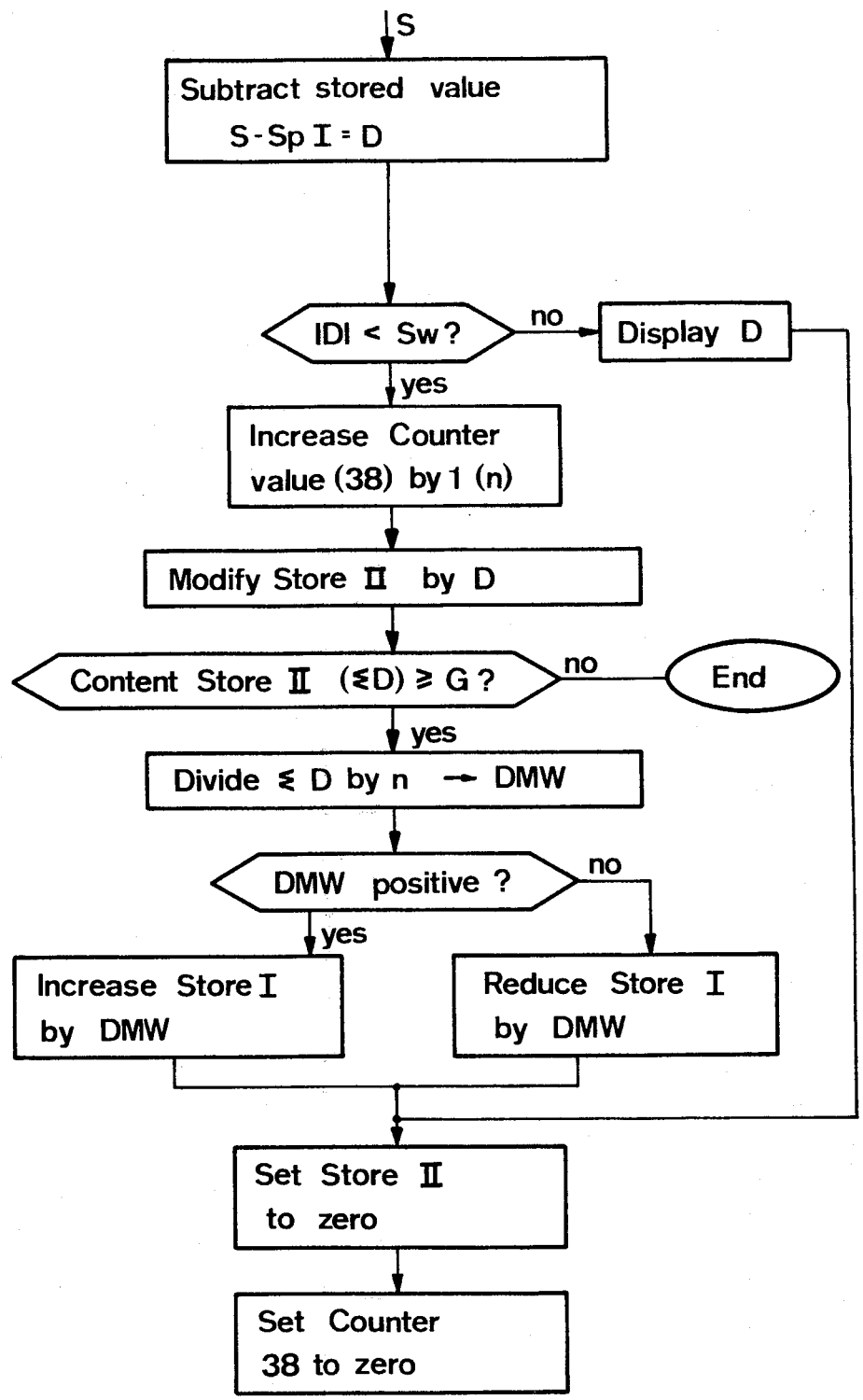

As described, the apparatus of the present invention is embodied in circuitry having discrete components of the conventional type. However, a presently preferred embodiment utilizes a microcomputer which is a standard microcomputer utilizing a central processing unit, a read-only memory and a random access memory. A flow chart for such a microcomputer is shown in FIG. 2. Since the steps shown therein directly correspond to the method of operation of the circuit of FIG. 1 as described above, no further discussion seems required.

It should further be noted that the invention is by no means limited to scales having electromagnetic compensation. It is applicable for all scales in which digital weight signals are periodically generated. This, for example, would include scales having strain gauges as sensors, scales with transversely oscillating strings, etc.

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. In weighing method comprising the steps of periodically generating digital weight proportional signals, comparing said weight proportional signals to a reference signal and generating main difference signals corresponding to the difference therebetween, comparing said main difference signals to a predetermined threshold signal and furnishing a first or a second difference signal when said main difference signal is, respectively, less than or at least equal to said predetermined threshold signal, and displaying only said second difference signal, the improvement comprising the steps of storing a first difference signal; algebraically adding subsequently generated first difference signals to the so-stored first difference signal, thereby creating a cumulative first difference signal;

comparing said cumulative first difference signal to a predetermined limiting value and furnishing a comparator output signal only when said cumulative first difference signal exceeds said limiting value;

counting the number of first difference signals received until said cumulative first difference signal exceeds said limiting value signal and furnishing a counting signal signifying the number of so counted first difference signals;

dividing said cumulative first difference signal by said counting signal thereby creating an average difference signal; and wherein said average difference signal is applied to said weight proportional signals or said reference signal when generating said main difference signals.

2. A method as set forth in claim 1, wherein said average difference signal is algebraically added to said reference signal before comparing said weight proportional signals to said reference signal.

3. In weighting apparatus having means for periodically generating digital weight proportional signals, first comparing means for comparing said weight proportional signals to a reference signal and generating main difference signals corresponding to the difference therebetween, second comparing means for comparing said main difference signals to a predetermined threshold signal and furnishing a first or a second difference signal when said main difference signal is less than or at least equal to said threshold signal, respectively, automatic zero correcting apparatus comprising means for storing a first difference signal in a first predetermined storage (32);

means for algebraically adding subsequently furnished first difference signals to the so-stored first difference signal, thereby creating a cumulative difference signal;

means for comparing said cumulative difference signal to a predetermined limiting value and furnishing an excess difference signal when said cumulative first difference signal exceeds said predetermined limiting value;

means for counting the number of first difference signals together constituting said cumulative first difference signal and furnishing a counting signal signifying the so-counted number of first difference signals;

means for dividing said cumulative first difference signal by said counting signal, thereby creating an average value difference signal; and means for applying said average value difference signal to said first comparing means so that said comparing means generates said main difference signal in part in dependence on said average value signal.

* * * * *